May 21, 1968 J. T. JONES ET AL 3,383,904
AUTOMATIC ANTIKNOCK RATING AND ADJUSTMENT APPARATUS
Filed June 25, 1962 7 Sheets-Sheet 1

Fig. 1.

INVENTORS
John T. Jones,
William C. Ludt &
Hudson W. Kellogg
BY Donald L. Johnson
ATTORNEY

United States Patent Office 3,383,904
Patented May 21, 1968

3,383,904
AUTOMATIC ANTIKNOCK RATING AND ADJUSTMENT APPARATUS
John T. Jones, Ardsley, William C. Ludt, Yonkers, and Hudson W. Kellogg, Dobbs Ferry, N.Y., assignors to Ethyl Corporation, New York, N.Y., a corporation of Virginia
Filed June 25, 1962, Ser. No. 205,015
10 Claims. (Cl. 73—35)

The present invention relates to the measurement and adjustment of antiknock ratings of fuels such as gasoline.

Among the objects of the present invention is the provision of novel apparatus for automatically measuring antiknock ratings rapidly and accurately without the usual amount of watching and handling.

Other objects of the present invention include the provision of novel apparatus for automatically adjusting the antiknock rating of the above type of fuels.

The foregoing as well as additional objects of the present invention will be recognized from the following description of several of its embodiments, reference being made to the accompanying drawings wherein.

According to the present invention an automatic antiknock rating apparatus is provided for use with a test engine that has a detonation pick-up, a first actuator for changing its compression ratio and a second actuator for changing its fuel-air ratio. The apparatus includes a deviation computer for connection to the detonation pick-up to compute the deviation of the detonation intensity from a pre-set value and deliver a signal corresponding to that deviation, a deviation-reducing control for connection to the first actuator to change the compression ratio in a direction that reduces the deviation signal, a knock-maximizing control for connection to the second actuator to change the fuel-air ratio, and an automatic sequencer connected to the two controls to (I) cause the first actuator to bring the compression ratio to the value that produces an approximately standard knock intensity, (II) then cause the second actuator to reduce the fuel-air ratio to a very lean value, (III) terminate operation of the second actuator and re-initiate step I if in step II the knock intensity exceeds a pre-set upper limit above standard knock intensity, (IV) after the completion of step II operate the second actuator to increase the fuel-air ratio in stages about 5 to 10 seconds apart, (V) terminate operation of the second actuator and re-initiate step I if during step IV the knock intensity exceeds the pre-set upper limit above standard knock intensity, and (VI) indicate the antiknock rating when in step IV the knock passes through a maximum at the standard knock intensity.

The apparatus can be arranged to stop at the end of the above sequence, or it can be arranged to repeat the sequence with or without a change in the fuel fed to the engine.

According to a preferred embodiment of the present invention the compression ratio control is arranged to be intermittent in operation and can also be arranged to assure a minimum lag in the response to the detonation whenever a compression ratio adjustment runs continuously for more than about one second. It is particularly preferred to have the compression ratio control effected by intermittent current pulses having durations proportional to the magnitude of the deviation between the indicated knock intensity and the standard knock intensity.

The apparatus of the present invention is highly suited for automatically monitoring and/or adjusting the knock rating of a fuel stream in a fuel supply system such as in a gasoline refinery. In such an arrangement the automatic knock measuring equipment includes sampling means connected for receiving samples of a fuel stream to be adjusted, and also includes output elements that periodically develop an electrical correction signal corresponding to the difference between the antiknock rating of the sample and a predetermined desired rating. The correction signal can then be used to operate adjusting elements such as a mixing valve that controls the amount of high antiknock blending stock to the fuel system, and can adjust the fuel flow in a manner that reduces the magnitude of the correction signal. The high antiknock blending stock can be a refinery stock or it can merely be an antiknock concentrate such as tetraethyl lead with or without scavenger and diluent, or it can be a mixture of refinery stock with antiknock.

For best results the apparatus is arranged to automatically switch the fuel supply to the test engine periodically so that the test engine will operate on a standard reference fuel sufficiently frequently that any departure in the operation of the engine can be promptly detected and compensated for.

Figure 1:
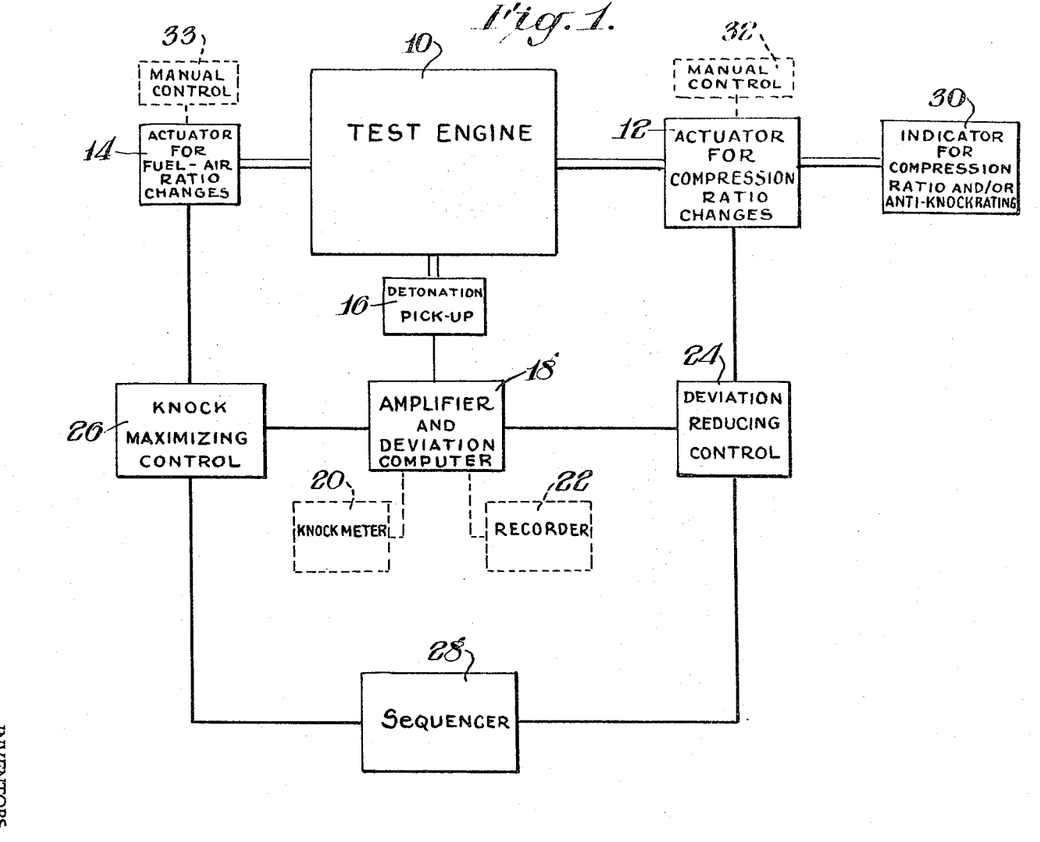
FIG. 1 is a schematic representation of an antiknock rating apparatus according to the present invention.

Referring to the drawings, the apparatus of FIG. 1 includes a test engine indicated at 10 which can be of the standard type such as illustrated and described in the 1960 ASTM Manual for Rating Fuels by Motor and Research Methods, published by the American Society for Testing and Materials, Philadelphia, Pa. Such a conventional engine can be and is frequently equipped with an actuator 12 for changing its compression ratio, which actuator is in the form of a reversible electric motor. The apparatus of FIG. 1 is further provided with a second actuator 14 for changing the fuel-to-air ratio of the combustion mixture supplied to the test engine. Actuator 14 can also be electrically operated as by means of a reversible electric motor.

As in the usual test engine construction, a detonation pick-up 16 is provided so as to develop an electrical signal varying in intensity in accordance with the intensity of the detonation or knock that occurs during the operation of the test engine. In the apparatus of FIG. 1 the signals so produced are delivered to an amplifier and deviation computer 18 which amplifies the signals and also determines how far the detonation or knock varies from some predetermined value. If desired the amplified signal can be displayed on a meter such as the usual knockmeter 20. In addition a recorder 22 may be used to make a record of the signals, either indicative of the degree of knock or of the deviation from the predetermined knock intensity, or both. Recorders of this type are well-known and will make records on circular or rectangular charts, usually with a moving pen actuated by the electric signal being recorded as well as by a timing mechanism that moves the chart.

The automatic testing of the present invention is effected by a combination of a deviation-reducing control 24, a knock-maximizing control 26 and a sequencer 28. The deviation-reducing control 24 is supplied with signals from the deviation computer 18 and is connected to compression ratio change actuator 12 so as to change the compression ratio in the direction which reduces the difference between a pre-set knock intensity and the knock intensity indicated by the detonation pick-up 16. The knock-maximizing control 26 is supplied with signals from the amplifier 18 or the detonation pick-up 16, and in turn is connected to the fuel-air ratio change actuator 14. Sequencer 28 is connected to operate the two controls 24 and 26 in the appropriate sequence. At the completion of the testing sequence the anti-knock rating can be read from an indicator 30 which is conveniently operated by the compression ratio change actuator 12. When operating at the fuel-air ratio for maximum knock intensity, each fuel has one specific compression ratio at which it will produce a standard knock intensity and this compression ratio determines the antiknock rating of that fuel. For ratings up to and including 100, the rating signifies the percentage of iso-octane (2,2,4-trimethylpentane) in a mixture of the iso-octane with normal heptane, which mixture develops the same standard knock intensity under maximum knock conditions at that compression ratio. For fuels having antiknock ratings above 100, the rating similarly represents the compression ratio at which the standard knock intensity is developed under maximum knock conditions by mixtures of iso-octane with tetraethyl lead rather than mixtures of iso-octane with normal heptane.

Indicator 30 can show both the antiknock rating and the corresponding compression ratio, or it can show merely one or the other of these values. Antiknock ratings have a standard relationship to the final compression ratios, as indicated for example in Table V on page 21 of the above manual.

For convenience in making preliminary or interventing adjustments of compression ratio, the construction of FIG. 1 can include a manual control 32 such as a simple three-position switch for energizing actuator 12 in one direction or the other, or for setting the actuator so that it is controlled only by the deviation-reducing control 24. A similar manual control 33 can be used for fuel-air ratio changes.

Figure 2:
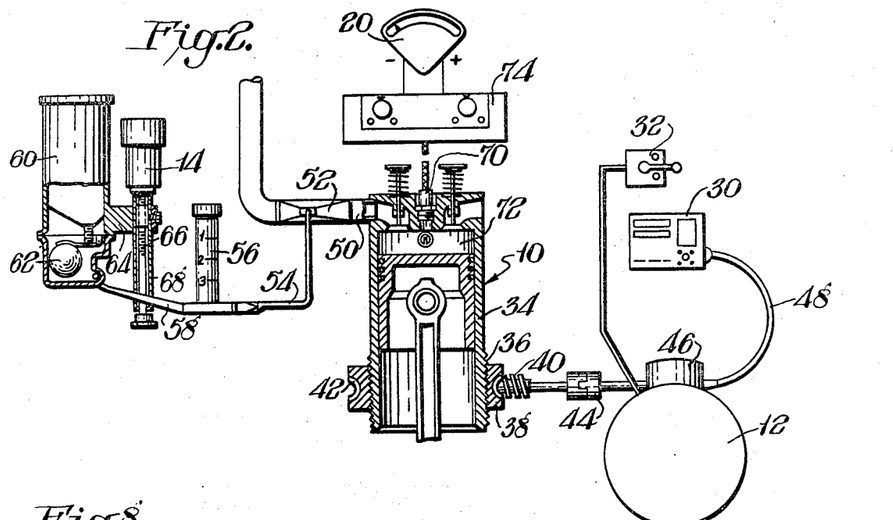
FIG. 2 is a generally diagrammatic view of the mechanical elements suitable for use in the apparatus of FIG. 1, showing a test engine and some of its related structures.

FIG. 2 illustrates the inter-relationship between the test engine 10, actuating motor 12 for changing the compression ratio of the engine, and actuating motor 14 for changing the fuel-air ratio. Engine 10 is of the conventional construction with its cylinder 34 movable to and fro along its cylindrical axis. Near the base of the cylinder it is provided with external thread 36 that meshes with internal thread on a rotary nut 38 which is in turn accurately supported so that it does not show any movement in the direction of the cylindrical axis. However, the nut 38 can rotate around that axis and is rotatably driven to and fro in that direction by a worm 40 that meshes with external threads 42 on the nut 38. Worm 40 is in turn driven by the motor 12 as by means of drive coupling 44 and speed reducing gear box 46. Indicator 30 can also be connected to be driven by worm 40 as by means of the flexible drive shaft 48.

The intake line 50 for engine 10 has the usual venturi 52 with a fuel discharge tube 54 leading to and opening in the venturi throat. A fixed fuel level sight glass 56 is shown as in communication with the fuel discharge tube 54 for convenience in reading the height of the fuel level, although such reading is not needed for automatic operation in accordance with the present invention. Flexible conduit 58 connects the fuel discharge tube 54 with a carburetor bowl 60 having a valve-controlling float 62 that determines the level of the fuel in which the float is immersed. The carburetor bowl 60 is provided with an arm 64 containing a vertical passageway that is internally threaded and threadedly engaged on a vertically disposed externally threaded shaft 66 journaled at its ends in a frame 68. One end of the threaded shaft 66 is connected for rotation by motor 14, and the shaft itself is so supported that it cannot move vertically. Frame 68 is also arranged to guide arm 64 so that the arm carries the carburetor bowl upwardly or downwardly, depending upon which way motor 14 rotates, without permitting the arm to tilt or swing. The higher the float controlled fuel level with respect to the venturi 52, the richer the fuel-air ratio of the mixture delivered to intake line 50.

The usual detonation pick-up 70 is mounted in the head or top of the test engine 10 so that the pick-up has its sensing element exposed to the combustion chamber 72 of the engine. The sensing element can be a simple piezoelectric transducer that generates an electrical signal when subjected to pressure or rate of pressure change, and modulates the signal so that it follows the change in pressure or in rate of pressure change. Knocking or detonation during engine operation causes development of pressures higher than for normal combustion and rates of pressure change in excess of those for normal combustion, and the electrical signal corresponding to these high pressures or high rates of pressure change can be readily distinguished. An amplifier 74 similar to that ordinarily used, can be arranged to amplify the electrical signals and make them suitable for reading by knockmeter 20. Amplifier 74 corresponds to the amplifier noted in FIG. 1 as an integral portion of unit 18.

Figure 3:
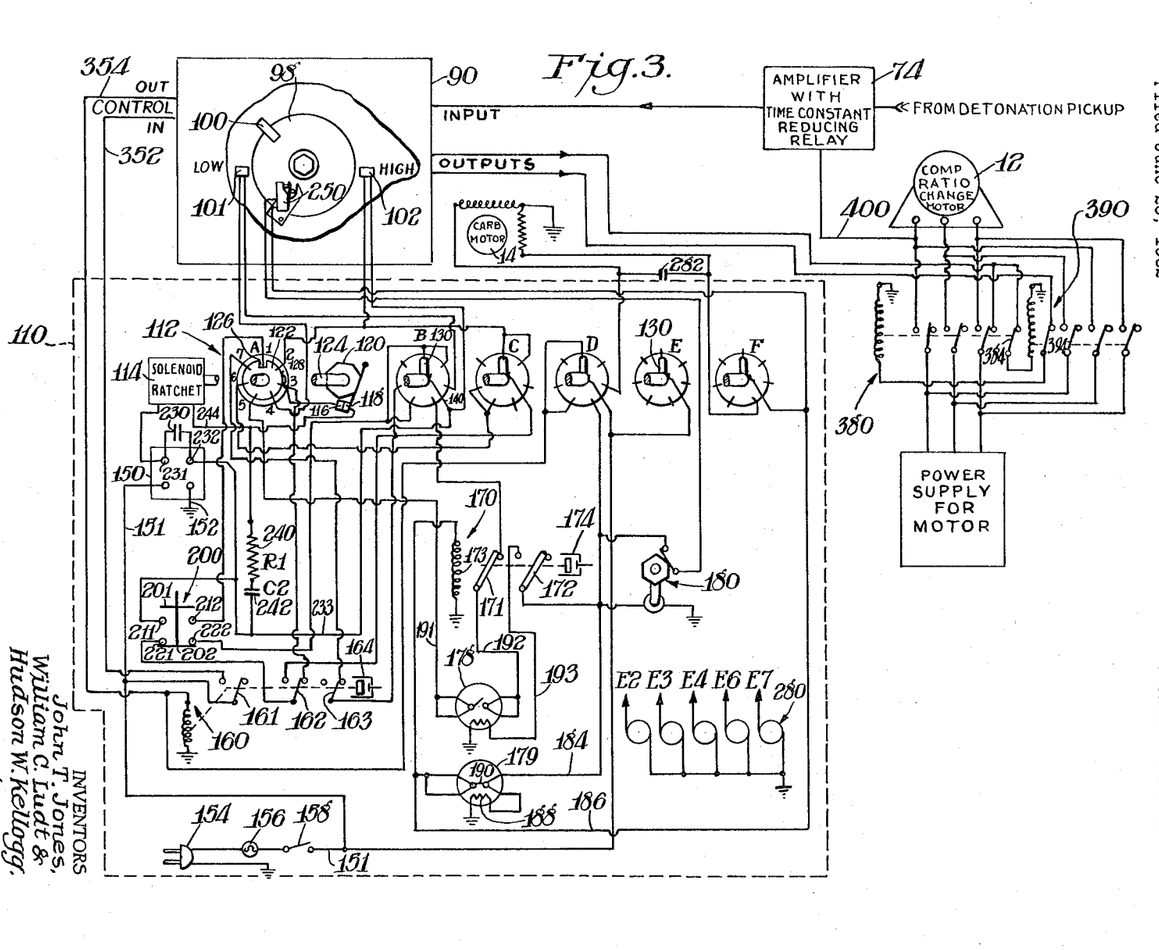
FIG. 3 is a partially schematic more detailed illustration of one form of an assembly of components that cooperate as in FIG. 1, to form an automatic rating apparatus representative of the present invention.
Figure 4:
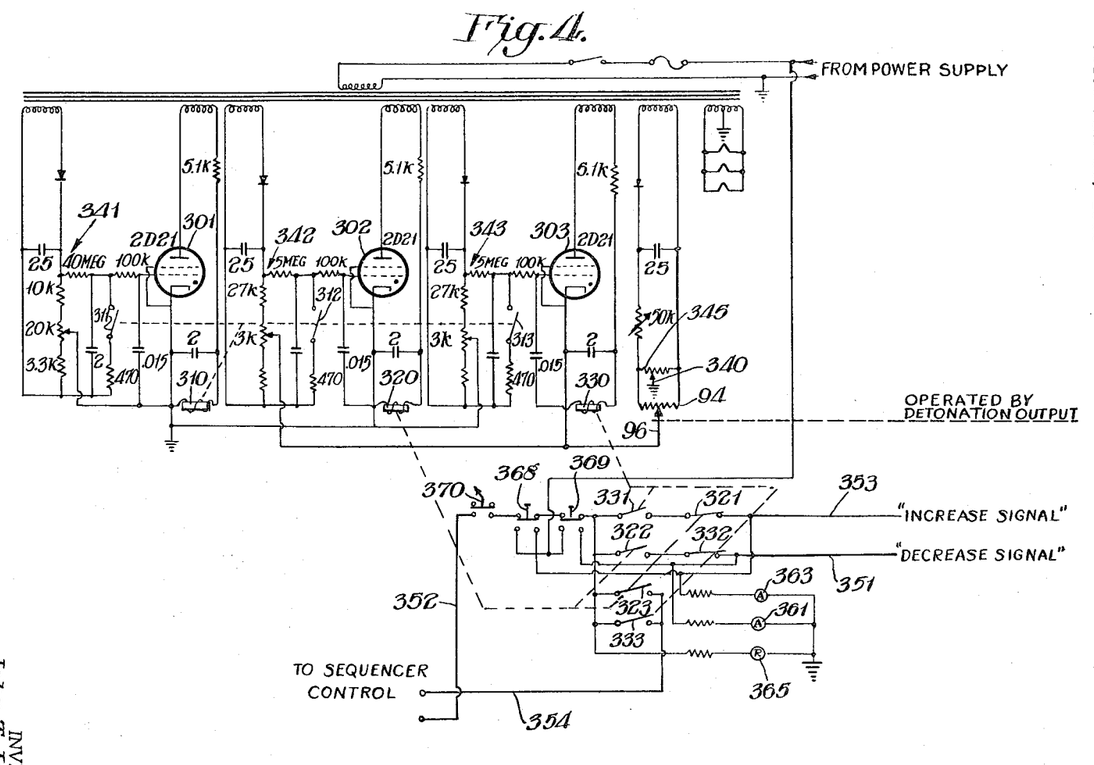
FIG. 4 is a circuit diagram of one form of deviation-reducing control for the apparatus of FIGS. 1 and 2.

FIG. 3 illustrates an automatic octane rating apparatus of the invention in which a deviation computer and portions of a knock maximizing control are combined in a single unit 90 which can also include the deviation reducing control shown in FIG. 4. Unit 90 is built around a recorder such as the Electronik 17 strip chart model available from Minneapolis-Honeywell Regulator Company and described in its instruction manual numbered 367001. The recorder has the usual chart that is fed from a supply roll to a take-up roll at a constant speed, and a pen that is traversed across the chart in accordance with variations in electrical signals delivered to an input terminal. These features are well known and since they are not essential parts of the present combination, are not illustrated. The recorder is also equipped with a control slide wire represented at 94 in FIG. 4, that has its wiper or tap 96 moved in accordance with movements of the pen so as to set up a control point having a potential intermediate between that across the ends of this slide wire.

Movement of the pen and tap 96 is effected with the help of pulley 98, and for the purposes of the present invention this pulley is provided with an actuator bar 100 that turns with it and is located so as to close either of a pair of switches 101, 102 when the pulley rotates sufficiently far in either direction. Switch 101 is shown as a low limit switch, and switch 102 as a high limit switch.

Unit 90 is under the control of a sequencer 110 that includes a ganged set of stepping switches 112 driven by a solenoid ratchet stepper 114. Six wafer-type switch segments, identified as A, B, C, D, E, and F, are in this ganged set along with a set of breaker contacts 116, 118 operated by cam 120. Wafer 112A has a central electrically conductive contact disc 122 rotated by shaft 124 common to all the switch segments, and it has a notch 126 at one portion of its periphery. A wiper or brush contact 128 is fixed and remains in electrical connection with the disc throughout its rotation so as to provide a fixed terminal for electrical connection to that disc. Around the periphery of wafer 112A are seven fixed terminals numbered 1, 2, 3, 4, 5, 6 and 7, each projecting centrally so that they come into wiping engagement with the disc as it rotates. Each terminal is, however, so dimensioned that when notch 126 is brought into opposition to it, the wiping end of the terminal will lie completely within the notch 126 so that that terminal becomes disconnected from the disc.

Segments B, C, D, E and F can also be of the wafer type with seven similarly located terminals each, but in each of these a narrow arm 130 is arranged to individually contact one of the terminals at a time as shaft 124 rotates. Arms 130 of each of the segments B, C, D, E and F are electrically insulated from each other as well as from disc 122, and each has its own fixed wiping contact 140.

Solenoid ratchet 114 is connected for energization by a DC source of current such as rectifier 150 which is shown connected through hot lead 151 and grounded lead 152 to a plug 154 that can be inserted in a conventional 110 volt AC power line receptacle. Fuse 156 and on-off switch 158 can also be included in this circuit.

The sequencer also includes a delay relay generally indicated at 160 for the deviation reducing control and another delay relay 170 for the knock maximizing control. Relay 170 operates in conjunction with an interrupter 180 as well as with delay switches 178 and 179.

Delay relay 160 has three switch armatures 161, 162 and 163 illustrated in the normal position which they take when this relay is not energized. In these positions the armatures engage back contacts. When relay 160 is energized it immediately pulls its armatures over so that they each engage front contacts and this operation is completed without any delay. However, when the relay is de-energized the armature will be held against their front contacts for a period of about one minute before the armatures are released from their front contacts and permitted to fall back to their back contacts. A dash pot 164 is illustrated as providing the above delay, but any other form of delay mechanism can be used if desired.

Relay 170 is operated in the same manner, a delay dash pot being here represented at 174. A pair of armatures 171, 172 forming part of relay 170 are shown in the normal position they take when this relay is not energized. Winding 173 of relay 170 is energized from either of a pair of parallel leads 184, 186, and in series in lead 184 is the delay switch 179 which is of the normally closed type that stays closed until about twenty seconds or so after power is supplied to lead 184. This type of operation is supplied by means of a heater 188 which forms part of switch 179, in combination with a switch arm 190 of bimetallic nature located so as to be warmed by the heater 188 to the degree required to snap open after the heat has been on for the above period of time.

Switch 178 is of the normally open type, the switch terminals being connected to leads 191, 192 and the heater being separately connected to lead 193.

The sequencer of FIG. 3 also has a reset or start switch 200 with two armatures 201, 202 mechanically biased to the illustrated position as by a spring, not shown. In this position armature 201 is out of engagement with a pair of contacts 211, 212, but armature 202 is in engagement with its two contacts 221, 222.

It is also desirable to connect a capacitor 230 across the DC output terminals 231, 232 of rectifier 150, and to connect a resistor 240 and capacitor 242 in series between terminal 232 and solenoid lead 244 with which terminal 232 is intermittently connected by the switching arrangement.

Pulley 98 of unit 90 has, in addition to the low and high limit switches 101, 102, mechanical maximum sensing elements that include a maximum switch 250 with an actuating nose 252 biased outwardly and holding this switch in open position. Maximum switch 250 (FIG. 5) is fixed on a plate 254 which in turn is pivotally secured to a stationary support 256. Mounting screw 258 passes through an aperture in plate 254 and through a bushing 260, and is threadedly engaged in support 256. This mounting screw arrangement permits plate 254 to pivot and also frictionally engages the plate sufficiently to keep it from pivoting unless it is rotated by a force of sufficient magnitude. A flat or arched spring friction washer 262 can be inserted between bushing 260 and plate 254 or between the head of the mounting screw 258 and plate 254, to improve the frictional engagement.

Figures 5, 6, 7:
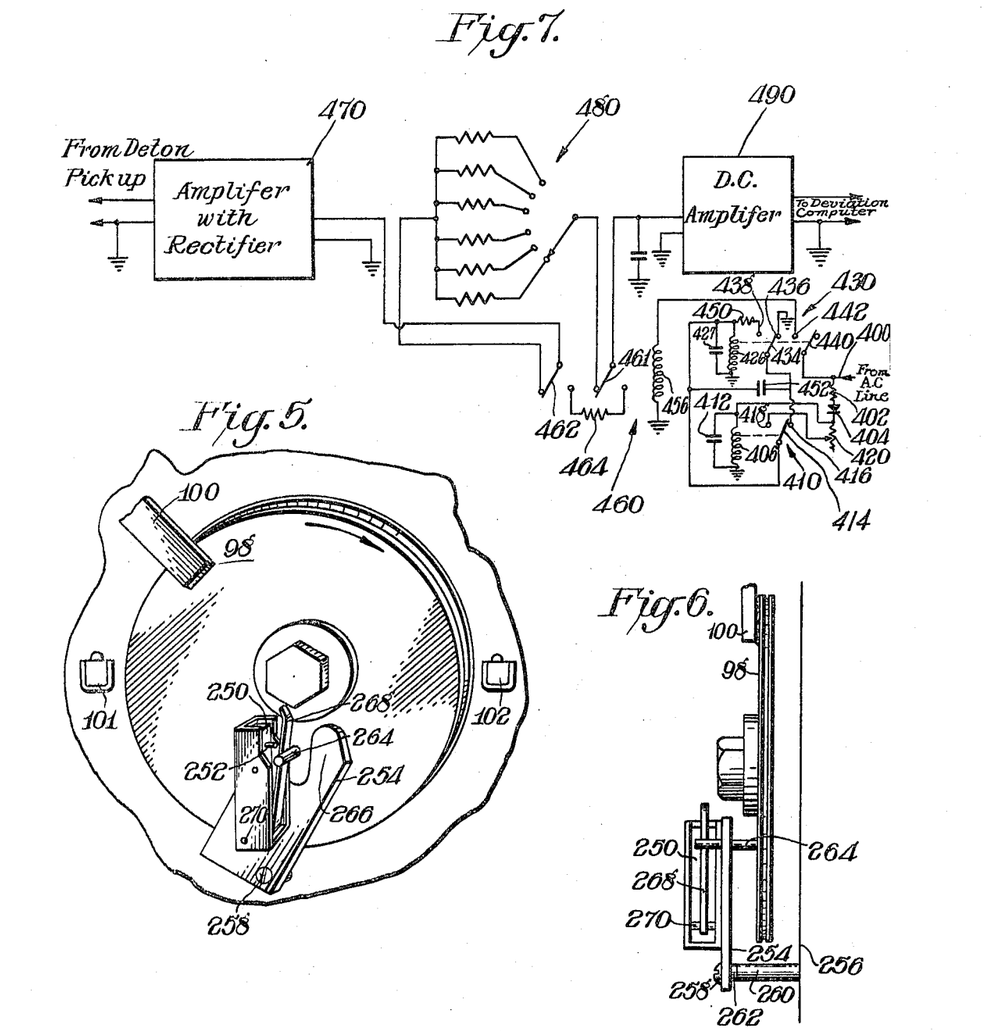
FIG. 5 is an enlarged plan view of one of the controls of FIG. 1.
FIG. 6 is a side view of the control of FIG. 5.
FIG. 7 is a more detailed illustration of an auxiliary unit in the construction of FIG. 3.

Pivoting of the plate is effected by a pin 264 secured to the face of pulley 98 and arranged to engage the switch 250 as the pulley 98 rotates. A cam lobe 266 in place 254 cooperates with pin 264 to pull the plate in clockwise direction around its mounting screw as seen in FIG. 5, when the pulley 98 rotates an appreciable distance in counterclockwise direction around its pivot. This clockwise pivoting of the plate 254 helps bring switch 250 closer to the pin so that the pin will not have as far to travel when it returns from a counterclockwise excursion. Because the titlting of plate 254 can position switch nose 252 at varying distances from the center of pulley 98, an auxiliary contactor 268 can be used to cover nose 252 and provide engagement for pin 264 regardless of the tilt of plate 254. Auxiliary contactor 268 can be journaled on a pivoted bar 270.

Indicator lights 280 can also be used to show the condition of the apparatus, and a capacitor 282 can be connected between the ungrounded ends of the drive windings for motor 14.

The various leads in the sequencer of FIG. 3 are connected as follows:

Terminal 1 of switch segment A to terminal 212.
Terminal 2 of switch segment A to terminals 1 and 2 of switch segment C and to first end of high switch 102.
Terminal 3 of switch segment A to back contact for armature 162.
Terminal 4 of switch segment A to first end of low switch 101.
Terminal 5 of switch segment A to lead 191.
Terminal 6 of switch segment A to terminals 5 and 6 of switch segment C.
Terminal 7 of switch segment A to back contact for armature 163.
Center contact of switch segment A to lead 244 (through breaker points 116, 118).
Terminals 1, 2 & 5 of switch segment B to terminal 222.
Terminal 3 of switch segment B to second end of low switch 101.
Terminal 4 of switch segment B to back contact for armature 171.
Terminal 6 of switch segment B to armature 163.
Center contact of switch segment B to terminal 211 and second end of high switch 102.
Center contact of switch segment C to front contact for armature 162.
Terminals 1 & 5 of switch segment D to winding of relay 160.
Terminal 3 of switch segment D to carburetor motor (lowering connection).
Terminal 4 of switch segment D to lead 184, armature 172, one terminal of motor of interrupter 180, and one of the interrupter terminals of interrupter 180.
Center contacts of switch segments D & E to power supply lead 151.
Terminals 2, 3, 4, 6 & 7 of switch segment E to indicator lights 280.
Terminal 4 of switch segment F to carburetor motor (rising connection).
Center contact of switch segment F to lead 186 and first end of maximum switch 250.
Second terminal of interrupter 180 to second end of maximum switch 250.

Lead 193 to front contact for armature 172.
Armature 162 to terminal 221.

FIG. 4 illustrates a highly effective form of deviation reducing control similar to that available commercially as Model HP–102 Deviation Proportional Pulse Control Relay of the Minneapolis-Honeywell Regulator Co. As in this commercial model, the control of FIG. 4 has three thyratron tubes 301, 302 and 303 connected with discharge circuits and discharge tripping circuits. Relays 310, 320 and 330 have their windings in series in the respective discharge circuits. Relay 310 has three armatures 311, 312, 313 and simultaneously moves all three to switch-closing position when it is energized by a discharge in thyratron 301. Such discharge is triggered by an adjustable grid circuit 341 and the closing of the grid return circuit through armature 311 shorts out the grid triggering voltage so that the discharge soon terminates.

Meanwhile similar grid triggering circuits 342 and 343 charge up the grids of thyratrons 302 and 303 to near firing voltage, and if the voltage of tap 96 is different from that of tap 340 in a set point slide wire 345, one of these two thyratrons will have its grid voltage raised sufficiently to fire while the other will be lowered a little and will not fire.

Relay 320 is in the discharge circuit of the thyratron that fires when the voltage of the control slide wire tap is too high, and this relay actuates armatures 321, 322 and 323 from their normal positions which are illustrated to their actuated positions in which they close a circuit supplying a pulse of power to "decrease" lead 351 from a power supply lead 352. At the same time a similar "increase" signal lead has its open connection further opened to help assure that both "increase" and "decrease" signals are not delivered simultaneously.

Conversely, when the relay 330 is energized, it actuates armatures 331, 332 and 333, delivering a pulse of "increase" signal.

When the potentials of taps 96 and 340 are sufficiently close together, neither of the thyratrons 302, 303 fire, and no signal is delivered to line 351 or line 353. In any case, the shunting action of armatures 312, 313 under the actuation of relay 310 resets the firing circuits of thyratrons 302, 303 and prepares them for the next firing trigger.

A feature of the above deviation reducing control is that the correction pulses delivered to line 351 or 353 are longer when the taps 96 and 340 are further apart in potential. As a result the corrections will much more rapidly bring the knock intensity to the standard value as determined by set point tap 340, and will do this with less hunting.

Typical circuit constants for the circuit of FIG. 4 are given in the drawing (capacitances in microfarads and resistances in ohms) and provide very effective results when used with thyratron plate supplies at 270 AC volts and with grid potential supplies at 29 DC volts measured at their rectifier output capacitors. The potentiometer in the grid circuit of thyratron 301 is preferably adjusted to produce a pulse repetition rate of about one per ten seconds, and the potentiometers in the grid circuits of the other thyratrons adjusted so that thyratrons 302 and 303 just barely miss firing when the control slide wire tap has the same potential as the set point slide wire tap and the thyratron 301 fires. To help follow the operation of the circuit, indicator lights 361, 363 are connected in parallel with output leads 351, 353 and one of these will light whenever a correcting pulse is being delivered. Another light 365 is connected to light when power is supplied to lead 352 and is available to pulsing armatures 321, 322, 331 and 332.

Manual control switches 368, 369 of the momentary contact type are also shown as provided to enable manual pulsing of increase and decrease signals. An automatic disabling switch 370, preferably of the on-off type that remains in the position to which it is moved, can also be inserted in lead 352.

The apparatus of FIG. 4 is interconnected in the combination of FIG. 3 by having the power supply lead 352 of FIG. 3 switched on and off through armature 161 of relay 160 in FIG. 3. In addition another interconnection 354 is used to energize relay 160 whenever a correcting pulse of either kind is delivered by the circuit of FIG. 4.

The assembly of FIG. 3 is placed in operation after connection to the appropriate power supplies, by operating reset switch 200 to bring the sequencer into position 1 (illustrated), after which this switch is released. When the sequencer is in any other position the action of the reset switch in closing a circuit between contacts 211, 212, completes an actuating circuit from rectifier output terminals 231, 232 to the solenoid 114 through disc 122 of switch segment A and its terminal 1. The solenoid will accordingly rotate the selector one step clockwise as seen in FIG. 3. During this step breaker cam 120 opens breaker points 116, 118 until the step is completed. Holding reset switch 200 down will thus assure the stepping until selector reaches position 1 at which time the notch 126 opens the circuit to terminal 1 of segment A and the actuation is terminated.

At the same time segment D of the sequencer as it reaches position 1 completes a connection from power lead 151 through terminal 1 of the segment to the winding of relay 160. This actuates relay 160 which through its armature 161 starts the correction action of the deviation reducing control of FIG. 4. In the meantime the reset switch 200 is released and this completes a supplementary energizing circuit for the solenoid 114 from disc 122 through terminal 2 of segment A, terminal 1 of segment C, center contact of segment C, actuated armature 162, terminals 221, 222 of the reset switch, terminal 1 of segment B, center contact of segment B, lead 233 and terminal 232. This steps the sequencer to position 2 where the bulk of the correction action of the circuit of FIG. 4 is completed. At this position the notch 126 opens the above supplemental energizing circuit to terminal 2 of segment A so that the sequencer remains in position 2.

During the dwell in position 2 the compression ratio of the engine is brought by the deviation reducer of FIG. 4 to the value that produces a detonation signal corresponding to the predetermined standard as set by set-point tap 340. When the correspondence is sufficiently close, the deviation reducer will not develop a correcting pulse in output lead 351 or 353 and as soon as the time delay of relay 160 runs out, the armatures of that relay return to their deenergized position (the one in which they are shown) and this closes a solenoid actuating circuit from disc 122, terminal 3 of switch segment A, armature 162, terminals 221, 222 of reset switch 200, terminal 2 of switch segment B, center contact of switch segment B, and terminal 232. The solenoid accordingly steps to position 3, where the notch 126 again opens the solenoid circuit.

In position 3 the relay 160 remains deenergized but the switch segment D completes a circuit that energizes the carburetor motor 14 and causes it to lower the carburetor. This lowering leans out the fuel mixture and as a result reduces the knock intensity. As the intensity becomes lower, pulley 98 rotates in counterclockwise direction as seen in FIG. 3, and it will soon bring its arm 100 around far enough to close low switch 101. When this happens another solenoid energizing circuit is established from disc 122 through terminal 4 of switch segment A, low switch 101, terminal 3 of switch segment B, center contact of segment B, and terminal 232. This steps the solenoid to position 4 where notch 126 again stops it.

In position 4 the downward rotation of carburetor motor 14 is stopped, and instead switch segments D and F establish an upward rotating energizing circuit for that motor through lead 151, center contact of segment D, terminal 4 of segment D, lead 184, normally closed delay switch 179, lead 186, center contact of segment F and terminal 4 of segment F. The carburetor motor accordingly now raises the carburetor for a few seconds until delay switch 179 open circuits. This period is preferably about twenty seconds.

As the carburetor is thus raised, the detonation intensity increases and pulley 98 is rotated clockwise bringing its pin 264 against the nose 252 of switch 250, closing this switch. The closing of switch 250 establishes a carburetor raising circuit as a shunt across delay switch 179. This shunt branches off from lead 184 through the contacts of interrupter 180, the now closed maximum switch 250 and branches back to the center contact of segment F. Accordingly when delay switch 179 times out, the carburetor continues to rise but now does so in an interrupted manner, as for example, moving up in 2 to 5 second steps spaced by 5 to 10 second intervals of no movement. This intermittent upward travel of the carburetor is continued as long as it causes the knock intensity to increase and the pulley 98 to move in clockwise direction. When the maximum knock intensity is reached the pulley no longer rotates, and at the next raising of the carburetor the knock intensity diminishes and the pulley 98 makes a very small return step in counterclockwise direction. This withdraws pin 264 from the maximum switch and promptly permits that switch to return to its normally open position, thus stopping further carburetor movement.

In the meantime delay relay 170 was energized through delay switch 179 when the sequencher first reached position 4, and after delay switch 179 open-circuited, this relay continued to be energized through lead 186 each time the carburetor was driven upwards. Until maximum switch 250 opens, the armatures 171, 172 of the delay relay 170 are accordingly held in actuated position. In this position they prepare a step triggering energizing circuit for the solenoid 114, from terminal 4 of switch segment B to terminal 5 of switch segment A. This energizing circuit is kept open initially by normally open delay switch 178, and after that closes as a result of the heating action through actuated armature 172, actuated armature 171 keeps the circuit open. However, when the maximum switch 250 is opened, the relay 170 is no longer energized and it times out, closing the solenoid energizing circuit. The selector thereupon steps to position 5.

In position 5 switch segment D closes a circuit that actuates relay 160 and also supplies energy for the deviation reducer to operate and adjust the compression ratio of the engine. The actuation of armature 161 completes the energizing circuit for the deviation reducer, and at the same time actuation of armature 162 closes a stepping circuit for solenoid 114. This stepping circuit runs from disc 122 through terminal 6 of switch segment A. Terminal 5 of switch segment C, the center contact for switch segment C, armature 162, terminals 221, 222, terminal 5 of switch segment B, the center contact of switch segment B, and terminal 232. The sequencer accordingly promptly steps to position 6, but this does not interfere with the continued operation of the deviation reducer. When relay 160 times out at the end of the new compression ratio search, its arm 163 completes a solenoid stepping circuit that advances the sequencer to position 7. This stepping circuit runs from disc 122 through terminal 7 of switch segment A, armature 163, terminal 6 of switch segment B, the center contact for switch segment B, and terminal 232. In postiion 7 the measuring cycle is over and the apparatus does not function. It is ready, however, for another measuring cycle which can be initiated by merely operating reset switch 200 for a moment.

The compression ratio developed in step 6 need not be and generally is not the same as the compression ratio reached while the sequencer is in position 2, inasmuch as in position 6 the fuel-air ratio has been brought to maximum knock condition whereas at position 2 no maximum knock fuel-air ratio need have been present. The net result is that in position 6 the compression ratio will be automatically brought to the same value which would be arrived at through the standard A.S.T.M. process for manually measuring antiknock ratings. In fact the automatic process of the present invention can even be considered more accurate in that it elimnates errors that may be inherent in the interpolation which is part of the A.S.T.M. procedure. The maximum knock fuel-air ratio is generally the same when a fuel knocks at standard knock intensity, as when the fuel knocks at other intensities within a significant range above and below standard intensity. It is accordingly unnecessary to go through any more fuel-air adjustment steps after the first.

In some cases, however, the apparatus may be set for one fuel, and then used to test a fuel so greatly different that during the fuel-air adjustment, the operating limits of the apparatus might be exceeded. According to the present invention this is prevented by an automatic recycling arrangement. Thus, if during the lowering of the carburetor the knock intensity increases unduly, indicative of an excessively high initial carburetor position, arm 100 on pulley 98 will be brought into engagement with switch 102 causing that switch to close. This completes a recycle circuit from disc 122 through terminal 2 of switch segment A, high limit switch 102, center contact of switch segment B and terminal 232. This causes the solenoid 114 to ratchet the sequencer around until notch 126 reaches terminal 2, and in passing through position 1 just before this, relay 160 is energized through switch segment D to start another compression ratio search. This new search will end with the fuel-air ratio at a value more suitable for continued automatic adjustment.

Similar recycling also takes place if the knock intensity reaches the same high value during the carburetor raising at sequencer position 4, if this takes place before the maximum knock search is completed. In such a situation the high limit switch 102 is again closed and the same recycling circuit is completed to return the sequencer to position 2 and another compression ratio search.

In the combination of FIG. 3 the compression ratio change motor 12 is operated from the output leads of the deviation reducer by means of relays 380, 390. The motor itself is shown as operated by a three-phase power supply and each relay has three armatures conventionally arranged to interchange the connections to two leads of the three-phase power supply and thereby provide reversible motor actuation. A set of additional armatures 384, 394 included in each relay is series-connected in the enregizing circuit for the other relay to thereby reduce the possibility that both relays may inadvertently be operated at the same time. This result is obtained because energizing one relay opens the circuit through which the other must be energized.

Another feature of the present invention is the automatic adjustment of time constant that simplifies and speeds up the use of the apparatus. This is shown more fully in FIG. 7 where a lead 400 from the AC power circuit to compression ratio change motor 12 controls the time constant. This lead is connected through resistor 402 and rectifier 404 to the windings 406 of a relay 410 and then to the ground return. The windings are bridged by a small capacitance 412 to reduce chatter. Relay 410 has an armature 414 connected to the ground return through the windings 426 of a second relay 430. A back contact 416 for armature 414 is connected to armature 434 of relay 430. A front contact 418 for armature 414 is connected through an adjustable resistor 420 in the output of rectifier 404. A back contact 436 for armature 434 is grounded to the power return and a front contact 438 for this armature is connected through a small resistor 450 to the ungrounded end of windings 426. A second armature 440 of relay 430 is connected to the power lead 400 and has a front contact 442 which returns to ground through windings 456 of a third relay 460. A timing capacitor 452 bridged between contact 416 and its armature 414 arranges for the desired energization of relay 460.

When compression ratio change motor 12 is operated, power is supplied through lead 400 and actuates relay 410. This pulls armature 414 away from short-circuiting condition with respect to the timing capacitor 452 and permits the timing capacitor to charge up through resistor 420, front contact 418, armature 414, capacitor 452, armature 434 and back contact 436. After about a second or two of charging, the voltage will build up to the point where windings 426 are energized to trip relay 430 and cause its armature 440 to energize the third relay 460. Armature 434 will rapidly discharge capacitor 452. The three relays will then remain in those respective conditions until the power supply to lead 400 is interrupted, when all three relays 410, 430 and 460 will be deenergized.

Relay 460 adjusts the time constant for the knock measurement response by means of two armatures 461, 462 and a resistor 464. In the deenergized condition of relay 460, as illustrated, armatures 461, 462 merely complete the circuits from an amplifier and rectifier combination 470 through a selectable time constant adjusting resistor switching assembly 480 and through a further DC amplifier 490 so that the final signals can be delivered to the deviation computer. The conventional circuits can be used for units 470, 480 and 490 as in the standard detonation meter, Model 501–A or Model 501–AP. These meters are made available to the industry from the Waukesha Motor Co., Fuel Research Division, Waukesha, Wis. Waukesha Drawing L–6613–C gives the complete wiring diagram for the above components.

In the construction of FIG. 7, relay armatures 461, 462 are arranged so that when relay 460 is energized these armatures by-pass the resistor assembly 480 and connect unit 470 to unit 490 through a separate resistor 464, which can have a resistance corresponding to the lowest resistor of assembly 480. With this arrangement the energization of relay 460 will assure that the detonation time constant will be the smallest available regardless of the setting which selector assembly 480 may have.

It will be evident from the above that when a compression ratio search is being conducted and a correcting signal from the deviation reducer is of such long duration that motor 12 must run for more than one or two seconds, relay 460 is actuated and remains so until the motor stops running. This greatly accelerates the response of the signals supplied to the deviation computer from the knockmeter and is of considerable value in speeding up the automatic measurement as well as reducing hunting. Without the automatic time constant reduction the signals at the deviation computer may still be responding to the last compression ratio change when the next compression ratio change is called for. For very small compression ratio changes, however, a long time constant can be tolerated and is even preferred since it gives a more stable indication of a final knock intensity.

Although many different circuit constants can be used in the timing arrangement for relay 450, the following have shown very good results:

| | |
|---|---|
| Resistor 402 ohms | 40 |
| Resistor 420: Minimum do | 2500 |
| Maximum do | 5000 |
| Capacitor 412 microfarads | 0.25 |
| Capacitor 452 do | 80 |
| Resistor 450 ohms | 100 |
| Capacitor 427 microfarads | 0.30 |

Also for the circuit of FIG. 3,

| | |
|---|---|
| Resistor 240 ohms can be of | 10,000 |
| Capacitor 242 microfarads | 0.10 |
| Capacitor 282 do | 0.80 |
| Capacitor 230 do | 0.25 |

Although control slide wire 94 is shown as part of the combination of FIG. 4, it can be physically located elsewhere and is conveniently a part of unit 90 in FIG. 3. This unit in one practical arrangement is a standard type recorder with a repeater or so-called self-balancing slide wire as in the above-mentioned Minneapolis-Honeywell recorder, or as in U.S. Patent 3,034,125 granted May 8, 1962.

Figure 8:
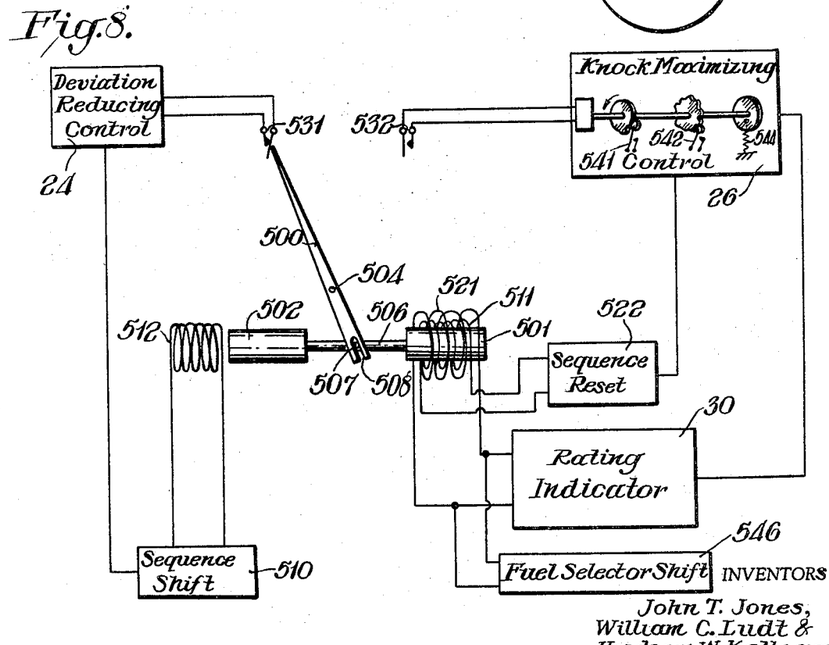
FIG. 8 schematically shows another form of assembly illustrative of the present invention.

The sequencer of the present invention need not have the form illustrated in FIG. 3 and a different embodiment is shown in FIG. 8. Here there are two sequence conditions determined by the position of a control arm 500 which is pivoted at 504. Movement of the arm around the pivot is accomplished by a pair of solenoid cores 501, 502 actuated by separate windings and connected together by a rod 506 that has a pin 507 engaged in a slot 508 in the arm. Two different windings 511, 521 are arranged to actuate core 501 to move the arm to the counterclockwise position in which it is illustrated and where it holds a switch 531 closed. A single winding 512 is arranged to move the arm clockwise to a position where it holds a different switch 532 closed. Both switches 531, 532 are of the normally open type so that they remain open unless closed by the arm.

Switch 531 energizes deviation reducing control 24 which can, by way of example, be of the type illustrated in FIG. 4. This control in turn operates a sequence shift 510 as for example when one or several successive timing pulses of the deviation reducing control produces no compression ratio increase or decrease signal. For such operation relay 310 of the construction of FIG. 4 can have an additional armature that closes a switch in a sequence shift energizing circuit each time thyratron tube 301 fires. Switches like 323 and 333, operated by the increase and decrease tubes 302 and 303 respectively but arranged in normally closed condition, are connected in series in the same energizing circuit so that the delivery of either an increase or decrease signal opens the energizing circuit. The sequence shift is accordingly not completed until one or more energizing pulses are delivered to shift unit 510, and indicates that the knock intensity has reached a predetermined standard value.

Actuation of shift unit 510 causes winding 512 to attract core 502 moving the core to the left and thus rotating arm 500 to its clockwise position. This opens switch 531, discontinuing the operation of the deviation reducing control, and closes switch 532 to energize the knock maximizing control 26. Such control can have a simple time actuated cam operated assembly of switches 541, 542 that first lowers the carburetor to the desired minimum fuel-air ratio (switch 541), and then raises it in the intermittent manner described above in connection with FIG. 3 (switch 542). Excessive lowering of the carburetor can be prevented by using a minimum position switch that opens the lowering circuit when the desired low level is reached.

Maximizing control 26 is connected to operate a sequence reset unit 522 in the event the knock intensity exceeds the preset standard value before the maximum knock condition is reached. This energizes winding 511 to return arm 500 to the counterclockwise position in which it stops the knock maximizing and starts another compression ratio search through control 24. In the meantime the knock maximizing unit 26 is returned to its starting position as by a return spring 544 that is overcome by the timing drive but takes over when the timing is deenergized.

The second compression ratio search in a sequence will generally be carried out with the fuel-air ratio closer to the final desired value so that at the following knock maximizing step a maximum will be reached at the standard value. If the standard value is again exceeded, however, a third recycle will be effected and this time the desired maximum should be obtained. Rating indicator 30 is then energized to show and/or make a record of the compression ratio and/or antiknock rating. This can be arranged to terminate the operation of the apparatus, or else continue the testing with another fuel sample. In either case rating indicator 30 energizes winding 521 to return the apparatus to compression ratio search condition. Also it can operate a fuel selector shift valve 546 to automatically switch the carburetor to a new fuel supply so that the apparatus automatically continues to measure and indicate antiknock ratings of different samples.

Figure 9:
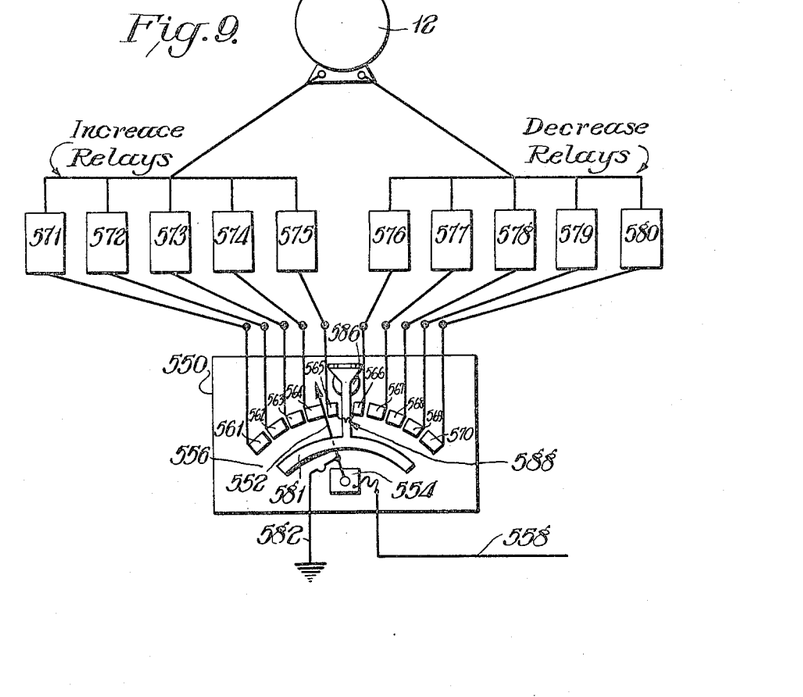
FIG. 9 schematically shows another form of control unit suitable for use in accordance with the present invention.

The deviation-reducing control can also have embodiments other than described in connection with FIG. 4. FIG. 9 shows such an alternative modification which is built around a D'Arsonval type meter 550 having a pointer 552 mounted on a pivoting arrangement 554 and balanced so that when not energized the pointer is held against a left-hand stop 556. Current supplied through lead 558 will then cause the pointer to pivot in clockwise direction away from the stop by an amount corresponding to the intensity of the current. Instead of or in addition to the usual meter scale, the meter 550 has a set of arcuate contacts 561, 562, 563, 564, 565, 566, 567, 568, 569 and 570 spaced from each other and extending the length of the arcuate path along which the pointer can travel. Each contact is connected to a separate relay of a set of relays 571, 572, 573, 574, 575, 576, 577, 578, 579 and 580.

The pointer 552 is made of metal or other electrically conductive material and is connected as by lead 582 so that it completes a common return to the energizing circuits for each of the relays 571 through 580. The pointer is normally positioned to move in a plane spaced from the plane in which the contacts 561–570 lie. However, the pointer is quite flexible and a contactor arm 581 connected as an armature of an electromagnet 586 is arranged to bend the pointer over to the plane of the contacts whenever the electromagnet is energized. When the electromagnet is deenergized the contactor is lifted away from the pointer as by a return spring that is not shown.

Each of the relays 571–580 is also connected to close a circuit that energizes compression ratio motor 12. The circuits of relays 571–575 cause the motor to rotate in the direction that increases the compression ratio, while those of relays 576–580 cause it to rotate in the opposite direction. Furthermore relays 575, 576 are arranged to deliver very short pulses of motor-energizing current; relays 574, 577 somewhat longer pulses; relays 573, 578 still longer pulses; relays 572, 579 pulses that are even longer, and relays 571, 580 the longest pulses. Dashpots or other time delay devices can be used to provide the above pulse variations. The longer acting relays such as 571, 572, 573, 578, 579 and 580 can also be connected as by separate contacts to decrease the time constant of the knock amplification circuits.

The meter 550 can be of the general construction available commercially under the name "LIAD multi-contact meter-relay" from Assembly Products, Inc., Chesterland, Ohio, or Desert Hot Springs, Calif. Its arcuate contacts can be so located that there is an appreciable space or dead band 588 between the central pair 565, 566, while the spaces between the other contacts are not as wide as the contact on the pointer. The latter spacing will assure that at least one relay will be operated every time the pointer is pushed into the plane of the arcuate contacts while the pointer is in a rotary position materially removed from the dead band 588.

The apparatus of FIG. 9 is operated by connecting its lead 558 to the output of the knock signal circuit and supplying to its electromagnet 586 a uniformly timed succession of identical energizing pulses. The knock signal circuits and/or movement of the motor 550 are adjusted so that the dead band 588 defines the standard knock intensity. The apparatus will then automatically operate to bring the compression ratio of a test engine to the value that produces standard knock intensity.

A feature of the construction of FIG. 9 is that it can be operated with knock signals of the relatively low level used to operate standard knockmeters so that no further amplification of these signals is needed. In fact meter 550 can even be made to operate with signals in the 1 millivolt range or smaller ranges for which some of the standard amplification used with knockmeters can be eliminated.

Figure 10:
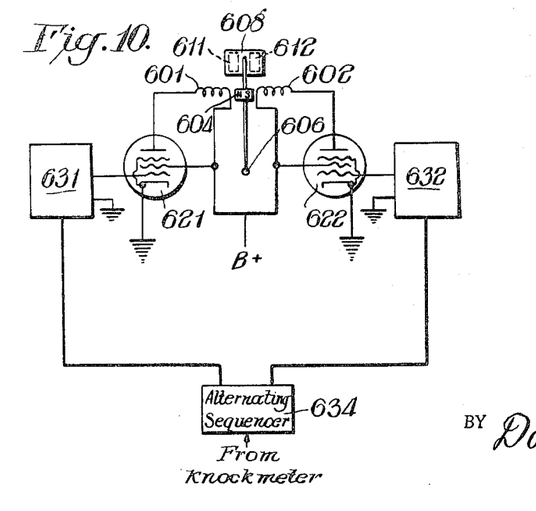
FIG. 10 is a schematic representation of a modified control unit in accordance with the present invention.

The knock maximizing arrangements of the present invention need not be made with a recorder as at 90 in the construction of FIG. 3. The same type of maximizing means can be used with a pulley 98 or similar rotary member driven directly by the compression ratio motor 12, as by means of a drive connection similar to flexible drive 48 in FIG. 2. FIG. 10 shows a different form of knock maximizing device in which two solenoids 601, 602 are operated in opposition to each other with a magnetized armature 604 polarized with respect to the solenoids so that when equal currents pass through the solenoids the armature is balanced between them. For this purpose each solenoid is connected so that current through it causes it to repel the armature. The armature is pivoted as at 606 and carries a flag 608 which, when the armature is balanced, will cover two photoelectric cells 611, 612.

The currents through the respective solenoids 601, 602 are supplied from separate amplifiers shown as vacuum tubes 621, 622 having bias circuits 631, 632 controlled by an alternating sequencer 634. Signals from the knockmeter are supplied to sequencer 634 which is arranged to intermittently deliver the knockmeter signal to the bias circuits 631, 632 in alternate fashion. The sequencer or bias circuits themselves can have a repeater that develops a bias voltage that varies with the knockmeter signal intensity and maintains that bias voltage between the intermittent sequencer steps. A conventional self-balancing bridge that drives a potentiometer tap or slide wire, is suitable for this purpose.

The apparatus of FIG. 10 is connected to a control that effects the raising of the carburetor bowl as in the intermittent manner described in connection with FIGS. 3 and 8. At each of the intermittent raising steps the alternating sequencer 634 applies the knockmeter signal so as to adjust the bias of one of the bias circuits 631, 632. The next intermittent step is applied by the sequencer to the other bias circuit. The raising of the carburetor bowl is carried through at least two steps regardless of the control action of the circuit of FIG. 10. The knockmeter signals will be slightly higher at each step of the sequencer so that the solenoids 601, 602 will be unbalanced at least for the second and subsequent steps so long as the knockmeter readings are increasing. Accordingly the armature 604 will be deflected to one side or the other, exposing one of the photoelectric cells 611, 612. Such exposure is arranged to continue the knock maximizing sequence.

When the knock readings reach a maximum, however, two successive knock readings will be substantially equal and at the second of these steps the armature 604 will be balanced and obscure both photoelectric cells. This deenergizes the sequencer to indicate that the knock maximizing search is completed, and if desired to shift to a new compression ratio search.

Instead of relying on a balancing of the armature, the apparatus of FIG. 10 can be arranged so that the alternating sequencer 634 alternately connects the photoelectric cells 611, 612 to control the discontinuance of the knock maximizing search. With this arrangement increasing knockmeter readings at each step will always cause the armature to be repelled from the solenoid operated at the individual steps. A corresponding switching of the photoelectric cells will accordingly develop alternating search-continuing signals from them. However, when a knock maximum is reached the knock intensity signals will begin to diminish and at the next step the armature will be moved in a direction opposite to that in which it moved during the knock-increasing steps. This movement will be out of step with the switching of the photoelectric cells so that a photoelectric signal of a different type will be obtained and will stop further searching.

The mechanical knock maximizer of FIGS. 4, 5 and 6 can also be operated to stop the maximizing search before the knock intensity signals diminish to any significant degree. For this purpose switch nose 252 can be biased outwardly, that is toward pin 264, by a spring only strong enough to gradually overcome the friction at the mounting pivot 258. With this arrangement rotation of pulley 98 after pin 264 first begins to depress nose 252, will cause the switch to close, after which the nose bias will rotate the switch around pivot 258 between the intermittent rotary steps of pulley 98. Switch 250 will accordingly be closed for only a short period of time at each such step. When the knock intensity reaches a maximum, however, the pulley 98 will not advance and will therefore leave switch 250 open and such open condition can then be used to terminate the knock-maximizing search.

Figure 11:
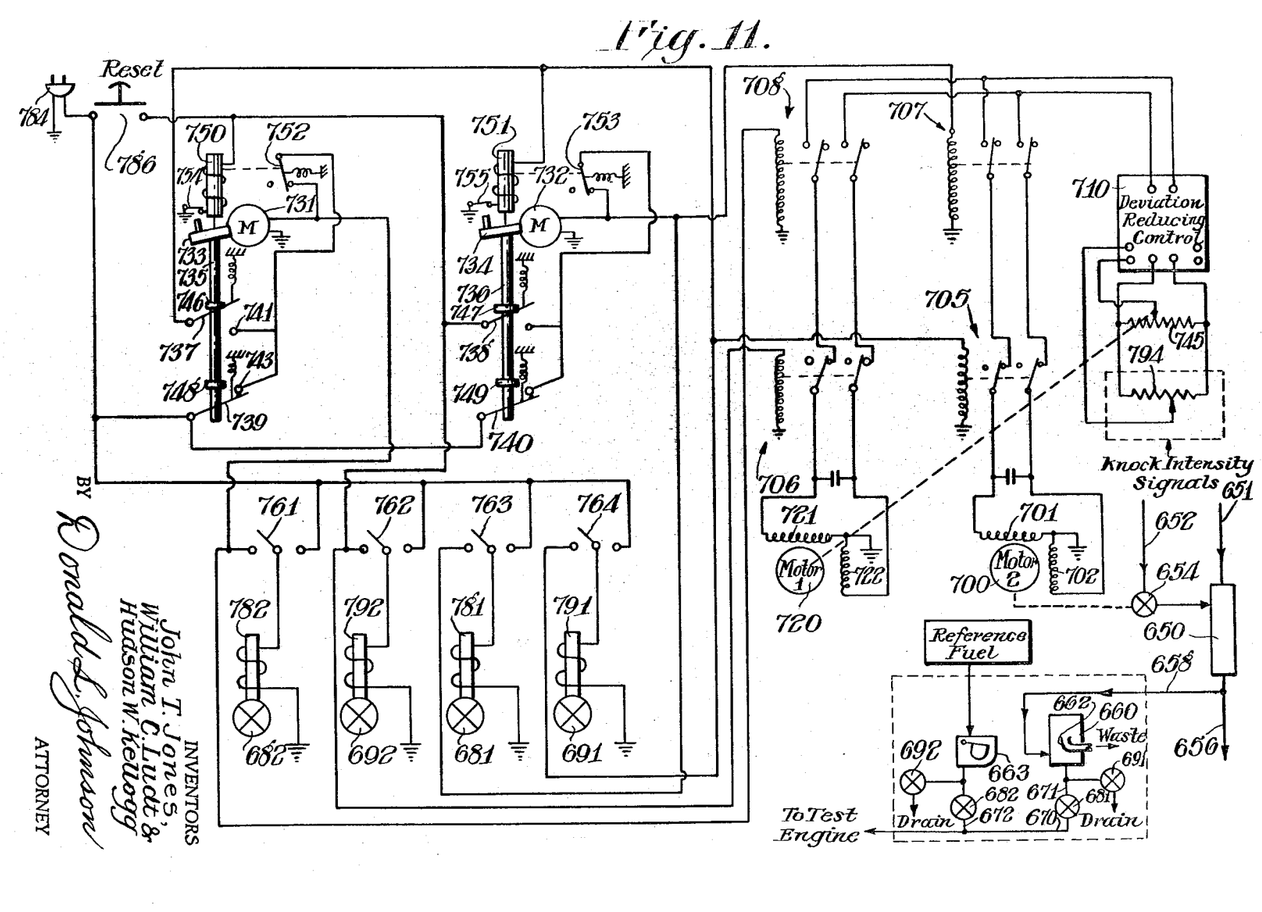
FIG. 11 is a detailed illustration of an adjusting assembly typical of the present invention.

FIG. 11 represents another embodiment of the invention in which a gasoline blending is carried out so as to automatically maintain the finished blend at a pre-set knock value. At 650 is shown a mixing unit which is supplied by a first blending stream through conduit 651 and a second blending stream through conduit 652. A valve 654 in conduit 652 is arranged to vary the rate at which the second stream is fed into the mixing unit. The blending stream in conduit 652 can be a standard antiknock concentrate such as the conventional tetraethyl lead with or without scavengers and preferably with a stabilizer that keeps the tetraethyl lead from decomposing too rapidly as when it is subjected to elevated temperatures. Other additives such as phosphorus-containing compounds and the like can also be present in the concentrate.

The final blend is withdrawn through conduit 656 and can be supplied to delivery lines, storage tanks, tankers, tank trucks or the like. A small bleed line 658 is branched off conduit 656 and supplies an auxiliary carburetor bowl 660 with a small flow of the final blend. An overflow 662 in auxiliary bowl 660 is so arranged that the fuel level in this bowl is identical with that in the main carburetor bowl 663. Each bowl supplies a feed line 671, 672 that discharges to the engine intake 670. Electrically operated valves 681, 682 in the bowl outflow lines 671, 672 are arranged to automatically select fuel from the individual bowls. In addition secondary valves 691, 692 can be connected to lines 671, 672 so as to drain the respective bowls if more rapid sampling of the fuels is desired. Bowl 663 can be kept supplied by a reference fuel of constant composition, in which event it is not necessary to drain bowl 663, and valve 692 along with its drain line can be dispensed with.

Blend control valve 654 can be of the usual remotely controlled type operated by an air motor or by an electric motor 700. This motor is of reversible type with separate windings 701, 702 which determine the direction of rotation. The windings are energized through a disabling relay 705 and a control relay 707 by a deviation reducing control 710 which can be like that of FIG. 4 or FIG. 9. In the illustrated FIG. 11 the deviation reducing control 710 includes a set-point slide wire 745 and a control slide wire 794, as in the construction of FIG. 4, with the control slide wire similarly operated in response to the knock intensity signals.

A companion reversible motor 720 with separate rotation controlling windings 721, 722, is also connected through a disabling relay 706 and a principal relay 708, and this motor is connected to operate slide wire 745 to control the setting of its set-point.

A pair of timers and associated secondary relays and switches are connected to energize the above relays as well as the appropriate valves 681, 682, 691 and 692. A first timer 731 includes an arm 733 which is rotated downwardly, as seen in the figure, by the timer motor and pushes down before it an actuating rod 735 that operates two switch blades 737, 739. Both blades are mechanically biased upwardly, as indicated, so that blade 737 is normally out of engagement with its cooperating contact 741 while blade 739 is in engagement with its cooperating contact 743. Lugs 746 and 748 are arranged on actuating bar 735 so that when the arm 733 moves downwardly, blade 737 engages its contact 741 before blade 739 is pushed away from its contact 743. A solenoid 750 cooperates with arm 733 so that when the solenoid is energized it pulls that arm up to a reset limit which marks the zero point from which timer motor 731 begins operation. A switch 752 in the normally closed position is also actuated to open condition by the energization of solenoid 750. Another switch 754 is normally closed but is mechanically forced open when arm 733 returns to the zero point.

A second timing motor 732 is similarly provided with a timing arm 743 and actuating rod 736, switch blades 738 and 740, lugs 747 and 749, solenoid 751 and switches 753 and 755. Additional solenoids for operating valves 681, 682 and 691, 692 are shown at 781, 791, 782 and 792 respectively. Switches 761, 762, 763 and 764 of the single pole, double-throw variety are also shown as connected so that by moving these switches to their left-hand positions all the valve solenods are set for automatic operation by the timers 731, 732. The switches can also be individually moved to their right-hand positions in which they directly energize their respective solenoids for manual operation when this is desired.

Disabling relay 705 is also connected for automatic operation in parallel with solenoid 791, and disabling relay 706 similarly connected for automatic operation in parallel with solenoid 792. Principal relay 707 is in parallel with solenoid 781 and principal relay 708 in parallel with solenoid 782. Power is supplied to the assembly through a connector 784 and start-up is arranged through a reset switch 786 of the momentary closing type.

Closing of the reset switch 786 sets the device in operation by energizing solenoid 750 along with solenoid 792 and relay 706. (All switches 761, 762, 763 and 764 are first placed in their automatic or left-hand circuit-closing positions.) The energization of solenoid 750 pulls timer arm 733 back to the zero position, thus deenergizing itself by the opening of switch 754. During the time solenoid 750 is energized it also opens switch 752, thus keeping timer motor 731 from operating. When solenoid deenergizes itself it permits switch 752 to close, completing an energizing circuit for time motor 731 through switch 739. This motor-energizing circuit also actuates solenoid 782 to hold valve 682 open. In the meantime reset switch 786 has been released so that solenoid 792 (along with relay 706) has become deenergized, permitting valve 692 to close. Accordingly carburetor bowl 663 which had been drained through valve 692 while it was open, is now permitted to feed fuel through valve 682 which is opened to the test engine when timer motor 781 starts running. During this operation of the test engine deviation reducing control 710 delivers correcting impulses as needed to carry the set-point of slide wire 745 to a position representative of the antiknock rating of the reference fuel (prototype). Relay 708 is energized throughout this period while relay 707 is deenergized so that the correcting impulses are delivered to motor 720 and not to motor 700.

The timing run of motor 731 can be arbitrarily set at a period which is adequate for the slide wire 745 to reach its setting. As timing motor 731 approaches the end of this timing run it first closes switch 737, thereby energizing solenoids 751 and 791 as well as disabling relay 705. Solenoid 751 thereupon resets timing motor 732 while solenoid 791 opens the drain for bowl 660. Solenoid 751 is promptly locked out by the return of timing arm 734 to zero position, and timing motor 732 then begins its run. By this time timing motor 731 has gone a little further and opened switch 739 so that it is stopped, valve 682 is closed and realy 708 is deenergized.

At the commencement of time motor 732, valve 681 is opened and relay 707 is energized. The test motor is accordingly switched to fuel from bowl 660 while further deviation reducing signals from control 710 are delivered to motor 700 rather than motor 720. Such signals will now operate valve 654 and adjust the blending flow from line 652 to the degree required to bring slide wire 794 in balance with slide wire 745.

As timer motor 732 approaches the end of its run it first closes switch 738 which resets timer motor 731 and opens drain valve 691. A little later timer motor 732 opens switch 740 thereby reaching the end of its run and completing the switch-over to the reference fuel.

The above alternate timing steps are then repeated indefinitely and will adjust the blending to the desired antiknock setting. Relays 705 and 706 can be of the type that when energized immediately open their switches, but only permit the switches to close after some time delay. This time delay can be arranged to span the transition period while the fuel shifting is being accomplished up to the time when the new fuel has stabilized itself in the engine intake system.

The apparatus of FIG. 11 can also be used with the knock maximizing control and appropriate sequencer where absolute knock values are to be attained. In such event, an automatic or manual check can be made of the set-point of slide wire 745 to make sure that it is correctly positioned for the reference fuel. If it is incorrect then the apparatus needs adjustment, generally to compensate for the drift normally experienced with test engines as they operate.

The apparatus of FIG. 11 can also be used to merely check compression ratios without changing fuel-air ratios. To this end the reference fuel used can be a preformed sample of blend from line 656. When the blending ingredient fed through line 652 is added in only small proportions, as for example when it is the above-mentioned antiknock concentrate, it does not significantly affect the fuel-air ratio required for the final blend to exhibit its maximum knock, and the preformed batch of reference fuel will have substantially the same maximum knock fuel-air ratio regardless of the blending proportions. At the very first timing run the apparatus can be set for that ratio either manually or automatically, and for each timing run after that it is sufficient merely to adjust the blend so that it requires the same compression ratio as the reference fuel to reach the same knock intensity. Because no draining of the reference fuel is needed with such an arrangement, as pointed out above, the total quantity of reference fuel needed can be relatively small for a blending operation of long duration. Further decreases in the amount of reference fuel needed can be arranged by adjusting the timer so that two or more final blend tests are made after every reference fuel test.

It is helpful to have sampling line 658 as short as convenient to minimize the flow rate required through it in order for the fuel in bowl 660 to match that in line 656. At the same time the connection from the sampling line 658 to outflow line 656 can be placed down-stream of valve 654 close to the mixing unit 650 so that automatic blending adjustments are promptly detected.

Where the streams fed through lines 651 and 652 are streams of different refinery products such that varying mixtures of them will show maximum knock at different fuel-air ratios, the apparatus of FIG. 11 can be expanded to include the entire test assembly of FIG. 3 with the sequencer automatically reset by the timer motors 731, 732. Also the carburetor bowls 660 and 663 can in this arrangement have their heights separately adjustable so that the adjustment of one to maximum knock will not affect the adjustment of the other.

It may also be desirable to apply a positive temperature control to the fuel fed to the test engine, as for example to compensate for heating by the valve solenoids 781, 782, 791 and 792. The continuous operation of one of these solenoids usually generates appreciable heat. The fuel lines adjacent these solenoids, or the solenoids themselves, may accordingly be jacketed with liquid flow passages through which is circulated a cooling liquid such as water or overflow fuel.

The reading of the control slide wire 794 with or without that of slide wire 745, can be shown in a display window as described above in connection with FIG. 2, or it can be printed out, photographed, or recorded as by continuous or intermittent recording. It can also be transmitted to remote locations for monitoring purposes. Analog or digital forms of the readings can be used for such transmission, and if desired digital forms can even be used for the control operations.

The sequencers of the present invention provide for each control function or step to go to completion regardless of the time required for moving to the next position and control function. Also at each step the switching action will take place without unnecessarily extending the time required for a given control function. Different fuel or gasolines react at different rates to changes in compression ratio and/or fuel-air ratio, and the sequencers of the present invention make the various adjustment as quickly, if not more quickly, than is possible manually.

The sequencer of FIG. 3 can also be connected to a fuel selector shift mechanism that shifts the supply of fuel to the engine 10 from one source to another, as for example by having a separate bowl and float valve combination for each source. One convenient form of shift mechanism includes a multiposition rotating plug selector valve linked to a stepping solenoid and arranged so that when the sequencer reaches position 7 it delivers a pulse of current to the solenoid and causes the valve to step around a circular path. At each step the selector valve closes one supply line and opens another. Six or eight steps or more can be provided in this circular path before the valve returns to its original position so that a corresponding number of fuels can be selected automatically. One or more of the fuels can be a reference fuel having a known antiknock rating so that the operation of the equipment can be checked.

It is a feature of the present invention that because the apparatus will operate automatically, it can in any measurement be arranged to go through as many sequences as necessary to reach a standard knock intensity as accurately as desired. By increasing the accuracy of this procedure, the need for comparison with standard fuels is greatly diminished. Occasional comparisons of this type will still be desirable in order to indicate when the engine or other components have drifted away from the desired operating characteristics and need correction or maintenance. Setting the high limit switch just above but close to the standard knock intensity position will materially increase the accuracy.

As discussed above, very good automatic knock measurement is obtained with the compression ratio correction pulses that increase in length as the knock intensity signals depart further from the desired standard. An exactly proportional variation between the correction pulse length and the departure from standard, so that doubling the departure doubles the pulse length, is highly effective but the pulses can increase in length faster or slower than this. It is preferred, however, that the pulse length increase at least about 10% as fast as the signal departures from standard, and that they increase no more than about twice as fast as the departures, inasmuch as this range provides most rapid automatic operation with little or no hunting and with signal intensity checks made as frequently as one per ten seconds. Other checking frequencies can also be used to advantage, particularly with the higher rates of pulse length variation as compared to signal strength changes.

Carburetor level raising is best accomplished in small steps about 5 to 10 seconds apart and preferably about 8 seconds apart, although the steps can be as little as one tenth millimeter and as much as five-tenths millimeter each. The length of time taken for each step should be held to the minimum, preferably not over two seconds.

The above conditions apply both to the antiknock testing as with the apparatus of FIG. 3, as well as to the simpler compression ratio adjustment desired as a preliminary step to use of the apparatus illustrated in FIG. 11.

The apparatus of FIG. 11 can also be arranged to control the operation of refinery units such as alkylation, platforming, hydroforming, reforming, catalytic cracking, etc., instead of blending. By connecting motor 700 so that it adjusts the critical controls to such apparatuses in accordance with the test measurements, they can be positioned to produce fuel stocks of the required antiknock quality. When making a test on a fuel, it is helpful to make sure that all gas bubbles are removed from it before it reaches the set level. Flowing streams are more apt to contain such bubbles, and the venting of the bowl 660 effectively removes them.

Instead of using an electrically energized motor to directly operate the blending valve, the motor can merely operate an air valve that raises the air pressure in a control conduit. This conduit can then be used to control an air-operated blending valve. Because of the greater safety inherent in air operation for valves in a refinery or blending unit, this type of control is very desirable.

It is also desirable to compensate antiknock rating or comparison results in accordance with variations in barometric pressure. This can be accomplished by merely having a recording of the barometric pressure at the time each test is carried out. Barometric pressure recording can be separately made by conventional barographs and any correction applied by separate calculation from the rating results expressed in compression ratio figures, or in the micrometer setting or compression ratio indication of the cylinder which is the value officially listed in the ASTM Manual.

As an alternative technique, the air intake for the test engine of the present invention can be arranged to be supplied with air at the standard barometric pressure so that no correction is needed and the rating is then read directly from the compression ratio indicated by the rating indicator of the apparatus. For this purpose the air intake of the test engine is connected to a compartment of fairly limited size, which compartment in turn is open to the outside air pressure through a limited passageway. A barometric switch in the compartment is connected with a damper or the like to throttle down the opening to the outside air pressure whenever the pressure in the compartment rises above standard. The compartment is also in communication with the discharge end of a blower which is actuated to increase the pressure within the compartment when the barometric switch shows that the compression within the compartment is falling below standard.

When air at standard barometric pressure is used it will be advisable to pressurize the fuel reservoirs and sight glasses to the same degree to prevent discharge of the fuel from vent holes.

The deviation-reducing control of the present invention can have forms other than those referred to above. The deviation can, for example, be computed mechanically as by causing the detonation signals to compress a spring balanced by a second spring which is given a predetermined standard compression, a pole of a double-throw switch being held between the springs so that it trips in a different direction. Magnetic balancing can also be similarly effected, depending upon which of the spring compressions is the greater one.

Obviously many other modifications and variations of the present invention are possible in the light of the above teachings. It is, therefore, to be understood that within the scope of the appended claims the invention may be practiced otherwise than as specifically described.

What is claimed:

1. An automatic antiknock rating apparatus for automatically indicating the antiknock rating of a fuel used to operate a test piston engine that has a detonation pick-up, a first actuator for changing its compression ratio and a second actuator for changing its fuel-air ratio, said apparatus having a deviation computer for connection to the detonation pick-up to compute the deviation of the detonation intensity from a preset value and deliver a signal corresponding to that deviation, a deviation-reducing control for connection to the first actuator to change the compression ratio in a direction that reduces the deviation signal, a knock-maximizing control for connection to the second actuator to change the fuel-air ratio, and an automatic sequencer connected to the two controls to (I) cause the first actuator to bring the compression ratio to the value that produces an approximately standard knock intensity, (II) then cause the second actuator to reduce the fuel-air ratio to a very lean value, (III) terminate operation of the second actuator and re-initiate step I if in step II the knock intensity exceeds a pre-set upper limit above standard knock intensity, (IV) after the completion of step II operate the second actuator to increase the fuel-air ratio in stages about 5 to 10 seconds apart, (V) terminate operation of the second actuator and re-initiate step I if during step IV the knock intensity exceeds the pre-set upper limit above standard knock intensity, and (VI) indicate the antiknock rating when in step IV the knock passes through a maximum at the standard knock intensity.

2. The combination of claim 1 in which the sequencer is connected to terminate all operations at the end of step VI.

3. The combination of claim 1 in which the test engine has a selector connected to select a fuel from different fuel containers and the sequencer is connected to automatically shift the selector from one container to another upon the termination of step V, and then repeat the entire testing sequence.

4. The combination of claim 1 in which the engine has a fuel inlet line connected to a refinery gasoline output line.

5. An automatic antiknock rating apparatus including a test engine having a piston fitted in a cylinder with a variable compression ratio, and a fuel supply having a controllable fuel-air ratio intake, first motor means connected to the engine for changing the compression ratio, second motor means connected to the engine intake for changing the fuel-air ratio, a detonation signal generator connected to the engine to deliver an electrical signal indicative of the degree of detonation, time constant control means connected to the detonation signal generator to change the time constant of the response to the detonation, a deviation computer connected to intermittently supply an output current of varying duration indicative of the deviation of the detonation from a predetermined standard intensity, said computer also including maximum knock sensing means for indicating when knock intensity changes go through a maximum, a sequence control connected to the deviation computer and to the motor means to cause the apparatus to automatically go through the following sequence of steps:

(I) intermittent actuation of the first motor means by the computer output current to bring the compression ratio of the engine to the point that produces the predetermined standard knock intensity;

(II) actuation of the time constant control means to reduce the time constant of the detonation signal response when the first motor means runs continuously through a compression ratio change for more than about 1 second, and to hold it reduced until that run of the motor is completed;

(III) deactuation of the first motor means when about a minute goes by without a change in compression ratio, this deactuation being followed by actuation of the second motor means to lower the fuel-air ratio to a value that brings the knock intensity somewhat below standard intensity;

(IV) deactuation of the second motor means and returning to step I when the knock intensity during step III reaches a value appreciably higher than standard;

(V) actuation of the second motor means to raise the fuel-air ratio in very gradual spaced stages when step III is successfully completed;

(VI) deactuation of the second motor means and returning to step I when the knock intensity during step V reaches a value higher than standard;

(VII) deactuation of the second motor means when in step V the knock intensity passes through a maximum before it gets high enough to initiate step VI, this deactuation being followed by actuation of the first motor means by the computer output current to bring the compression ratio to the value that produces standard knock intensity; and (VIII) indication of the antiknock rating corresponding to the final compression ratio reached in step VII.

6. The combination of claim 5 in which the sequence control for step V includes an energizing connection that automatically repeats alternate motor energizing and deenergizing with the energizing duration from about 2 to 5 seconds, and the deenergizing duration about 5 to 10 seconds.

7. The combination of claim 5 in which the deviation computer includes a mechanical maximum senser connected to trip a switch when the knock intensity begins to diminish.

8. The combination of claim 5 in which the deviation computer includes deviation proportional pulse control elements connected to deliver motor-energizing current pulses having durations proportional to the magnitude of the deviation.

9. A fuel antiknock rating apparatus which comprises:
(a) a standard test engine including a first actuating means for changing the compression ratio of the test engine and a second actuating means for changing the fuel-air ratio of the test engine;
(b) a detonation pickup mounted on said test engine which provides an output proportional to the detonation intensity of the test engine;
(c) a deviation computer comprising reference means and means responsive to the output of the detonation pickup for generating a deviation signal corresponding to the difference between the detonation pickup output and said reference means;
(d) a deviation reducing control connected to the first actuating means and responsive to the deviation signal to adjust the compression ratio in a direction which reduces the deviation signal;
(e) a knock maximizing control connected to the second actuating means and responsive to the output from the detonation pickup for adjusting the fuel-air ratio to give a maximum knock value;
(f) a sequence control for selectively operating the deviation reducing control and the knock maximizing control in a predetermined sequence; and
(g) indicator means connected to said test engine to indicate the compression ratio.

10. The combination of claim 9 in which the sequence control is connected to first operate the deviation reducing control to bring the knock intensity to a reference value, then operate the knock maximizing control to develop maximum knock fuel-air ratio without operating the deviation reducing control, and subsequently again operate the deviation reducing control without the knock maximizing control.

References Cited

UNITED STATES PATENTS

| | | | |
|---|---|---|---|
| 2,670,724 | 3/1954 | Reggio | 123—25.5 |
| 2,819,726 | 1/1958 | Rendel | 137—93 |
| 2,874,714 | 2/1959 | Pellerin et al. | 137—93 |
| 2,936,609 | 5/1960 | Pope et al. | 73—35 |
| 2,937,519 | 5/1960 | Brace et al. | 73—35 |
| 2,881,235 | 4/1959 | Van Pool. | |
| 3,000,812 | 9/1961 | Boyd. | |
| 3,238,765 | 3/1966 | Beal. | |

OTHER REFERENCES

ASTM Manual for Rating Motor Fuels by Motor and Research Methods, 1960. Copy in Patent Office Scientific Library, TP343 A 64a.

"McGraw-Hill Encyclopedia of Science and Technology" (1960), vol. 3, pp. 330–331 and vol. 14, pp. 359 and 360.

"Application Manual for Philbrick Octal Plug-In Computing Amplifiers," by G. A. Philbrick Researchers, Inc. (1956), p. 13.

"Servomechanisms and Regulating System Design," vol. 1 (1951), p. 206.

"Octane Numbers in Less Time" by H. W. Kellogg, from the "Oil and Gas Journal," June 20, 1955, pp. 89 and 90.

"Automation for Gas Blending," by H. H. Sisk from the "Oil and Gas Journal" of June 20, 1960, pp. 108–111.

"Automatic Blending Lives Up to Goal," by B. B. Butler from "Petroleum Refiner" of August 1960, pp. 97–100.

JAMES J. GILL, *Primary Examiner.*

E. P. FORGRAVE, *Assistant Examiner.*